Oct. 27, 1931. C. C. HANSEN 1,828,862
CHUCK FOR BROACHING STEEL
Filed Nov. 5, 1929
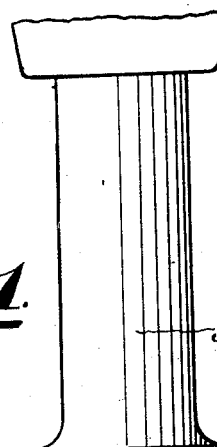
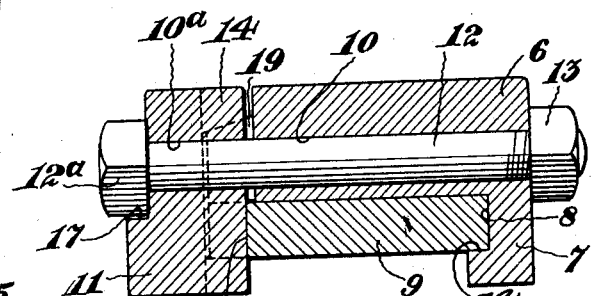
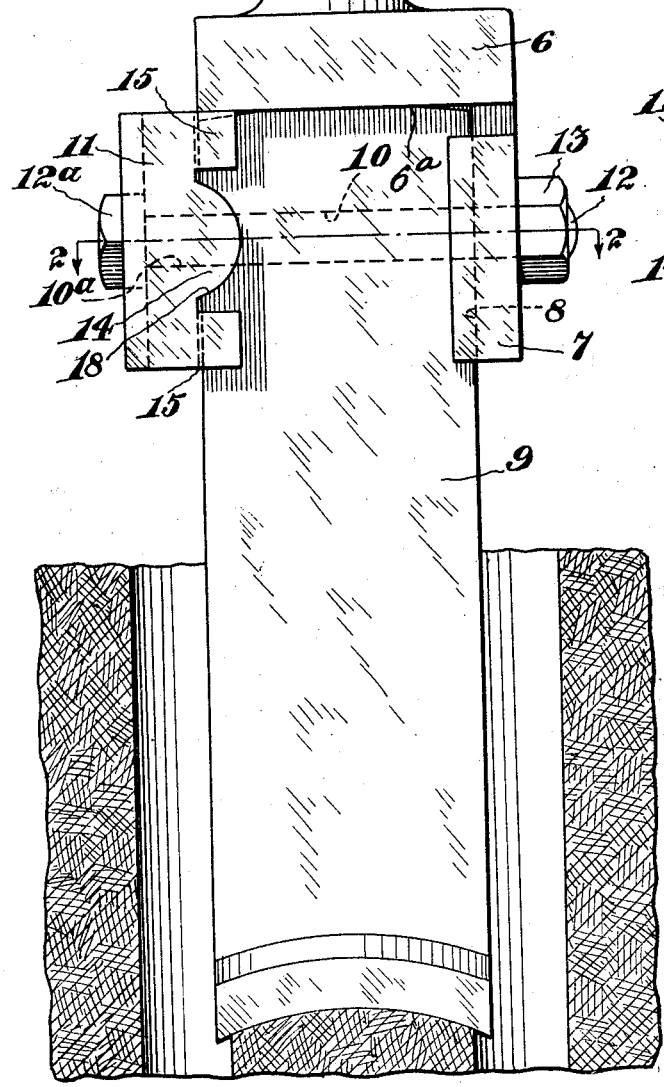
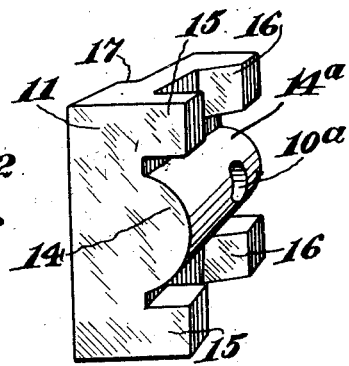
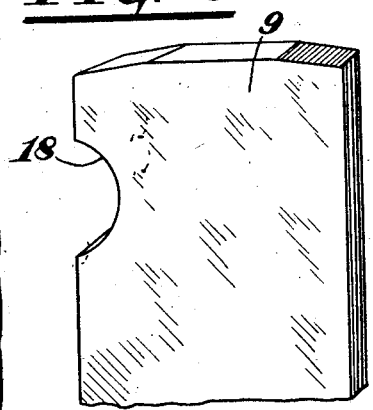
FIG.-1.
FIG.-2.
FIG.-3.
FIG.-4.
INVENTOR.
Charles C. Hansen
BY
HIS ATTORNEY.

Patented Oct. 27, 1931

1,828,862

UNITED STATES PATENT OFFICE

CHARLES C. HANSEN, OF EASTON, PENNSYLVANIA, ASSIGNOR TO INGERSOLL-RAND COMPANY, OF JERSEY CITY, NEW JERSEY, A CORPORATION OF NEW JERSEY

CHUCK FOR BROACHING STEEL

Application filed November 5, 1929. Serial No. 405,019.

This invention relates to fluid actuated rock drills of the percussive type, but more specifically to a chuck for broaching tools.

The chuck of the ordinary rock drill is designed to receive a round or hexagonal drill steel, and when the drill is to be used for broaching operations, which require a flat rectangular steel, the ordinary chuck is unable to accommodate the broaching steel. In the past many forms of chuck have been devised to receive a flat broaching steel but they have usually required a change in the front end of the rock drill. It is sometimes an advantage to be able to avoid changing one front end for another, or to avoid substituting one chuck for another thereby saving working time, and minimizing the chances for loss of parts and injury to the tool from improper assembly. To secure this advantage flat broaching steels with round shanks have been manufactured which will fit either a chuck for round or hexagonal steel, the round shank being used so that the rotational function, which is common to most rock drills, will be avoided as rotation is a disadvantage in broaching. Steels of this kind are expensive to manufacture, exceedingly liable to breakage and costly to repair when damaged.

It is the object of this invention to provide a simple, sturdy and inexpensive chuck having a round shank which may be received by any rock drill chuck and which will itself receive a flat rectangular broaching steel. Thus will be avoided the necessity of using a separate drill head or chuck for broaching operations or a broaching steel having the disadvantages of a specially shanked tool.

Other objects are apparent or will be referred to hereinafter.

In the accompanying drawings illustrating the invention,

Figure 1 is an elevation of the chuck with a broaching steel held therein,

Figure 2 is a cross section of the chuck taken on the line 2—2 and looking in the direction of the arrows, Figure 3 is a perspective view of the locking key, and Figure 4 is a similar view illustrating the rear end of a broaching steel with a slot cut to fit the locking key.

In the drawings, in which similar numerals refer to similar parts, a round shank 5 has an enlarged head at one end to form a comparatively flat steel receiver 6. The steel receiver 6 is preferably recessed on one side to form a flange 7 and a shoulder or abutment $6^a$ for the end of the steel 9. A groove 8 is formed in the flange 7 extending longitudinally therethrough and adapted to receive one side of the steel. When thus positioned a portion $7^a$ of the flange will overlap one side of the steel as shown in Figure 2. A bore 10 slightly elongated in cross section is cut transversely through the receiver 6 and a continuing bore $10^a$ is cut through a locking key 11 to register with the bore 10. A bolt 12 with a head $12^a$ goes through both said bores, and a nut 13 on the outside of the receiver clamps the locking key to the receiver and holds the broaching steel firmly in place.

The bores are elongated to enable a key portion 14 of the locking key 11 to take the load of the tool so that the bolt 12 will be relieved of any stress except that of holding the locking key to the receiver.

The locking key 11, which is seated on the side of the head, is formed as a separate member and is therefore removable from the head $12^a$, consists of a steel block recessed on one side to form a clearance for the steel 9 and having the key portion 14 projecting therefrom and having an outer curved or cam surface $14^a$. Two lugs 15 and two bevelled lugs 16 are formed on the locking key. The opposite or outer side of the locking key is formed to provide a locking shoulder 17 for the head $12^a$ of the bolt 12.

A partly cylindrical keyway or slot 18 cut into one side of the broaching steel 9 is engaged by the key portion 14. The other side of the steel is seated in the groove 8 and the steel is secured in this manner against lateral movement when the nut 13 is drawn up tightly on the bolt 12. The recessed side of the key is preferably spaced from the side of the steel 9 so that only the key portion 14 engages the steel. This construction will insure a more equal distribution of the clamping pressure should the side of the steel having the key portion 14 not be parallel with the side seated in the groove 8.

The steel 9 is also held against longitudinal movement when the locking key 11 is in position by the key portion 14 cooperating with the slot 18 to move the steel against the abutment 6ª. When the nut 13 is drawn up tightly the end of the steel will be held between the abutment 6ª and the key portion 14 and thus prevented from longitudinal movement.

The receiver 6 has bevelled lugs 19 which engage the bevelled lugs 16 on the locking key 11 which also has the lugs 15. When the locking key is held in position against the receiver 6 the bevelled faces of the lugs 16 and 19 bear against each other and the lugs 15 are brought snugly against the broaching steel and cooperate with the overlapping portion 7ª of the flange 7 to prevent the steel from moving transversely in the chuck.

I claim:

1. A chuck comprising a head having a shank thereon, an abutment on the head forming a stop for one end of a working implement, a locking key having a recessed portion forming a clearance for the working implement, a key portion on the locking key projecting from said recessed portion and having a cam surface to engage the working implement, means to secure the locking key to the head whereby the key portion will engage the working implement and move the end thereof against the stop to prevent longitudinal movement of said working implement relative to the head, and means for preventing transverse movement of the working implement with respect to the head.

2. A chuck comprising a head having a shank thereon, a flange on the head forming a seat for one side of a working implement, a locking key removable from the head and having a recessed portion forming a clearance for the opposite side of the working implement, a key portion projecting from the recessed portion and adapted to engage said opposite side of the working implement at a point intermediate the ends of the flange, means to secure the locking key to the head whereby the key portion will engage said opposite side of the working implement and hold the first side against the seat to prevent lateral movement of said working implement relative to the head, and means on the locking key to interlock with the head and the working implement for preventing transverse movement of the working implement with respect to the head.

3. A chuck comprising a head having a shank thereon, a flange on the head having a portion overlapping one side of a working implement, a plurality of bevelled lugs on the head adjacent the opposite side of said working implement, a locking key having a portion adapted to overlap the working implement on the side overlapped by the flange, a plurality of bevelled lugs on the locking key adapted to engage the bevelled lugs on the head, and means to secure the locking key to the head whereby the bevelled lugs on the head and locking key will cooperate with the overlapping portions to prevent transverse movement of said working implement relative to the head.

4. A chuck comprising a head having a shank thereon, an abutment on the head forming a stop for one end of a working implement, a flange on the head forming a seat for one side of a working implement, a removable locking key seated against the side of the head and having a recessed portion forming a clearance for the opposite side of the working implement, a key portion projecting from the recessed portion and having a cam surface to engage said opposite side of the working implement at a point intermediate the ends of the flange, means on the locking key to interlock with the head and the working implement for preventing transverse movement of the working implement with respect to the head, and means to secure the locking key to the head whereby the key portion will engage said opposite side of the working implement and hold the first side against the seat to prevent lateral movement of said working implement relative to the head and move the end of the working implement against the stop to prevent longitudinal movement of said working implement relative to the head.

5. A chuck comprising a head having a shank thereon, an abutment on the head forming a stop for one end of a working implement, a flange on the head having a portion overlapping one side of a working implement, a plurality of bevelled lugs on the head, a locking key having a portion adapted to overlap the opposite side of the working implement and a recessed portion forming a clearance for said working implement, a key portion projecting from said recessed portion and having a cam surface to engage said working implement, a plurality of bevelled lugs on the locking key adapted to engage the bevelled lugs on the head, and means to secure the locking key to the head whereby the bevelled lugs on the head and locking key will cooperate with the overlapping portions to prevent transverse movement of said working implement relative to the head and the key portion will engage the working implement and move the end thereof against the stop to prevent longitudinal movement of said working implement relative to the head.

In testimony whereof I have signed this specification.

CHARLES C. HANSEN.